(12) United States Patent
Imazu et al.

(10) Patent No.: US 12,420,789 B2
(45) Date of Patent: Sep. 23, 2025

(54) AUTOMATIC PARKING SYSTEM, AUTOMATIC PARKING METHOD, AND STORAGE MEDIUM FOR SETTING VEHICLE SPEED UPPER-LIMIT DURING AUTOMATIC PARKING CONTROL

(71) Applicant: TOYOTA JIDOSHA KABUSHIKI KAISHA, Toyota (JP)

(72) Inventors: Takanori Imazu, Susono (JP); Yoshiki Fukada, Susono (JP); Ryuji Okamura, Susono (JP); Takashi Hayashi, Mishima (JP); Kohki Baba, Susono (JP); Satoshi Omi, Ebina (JP); Akihiro Kusumoto, Susono (JP); Yuta Kataoka, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 415 days.

(21) Appl. No.: 17/890,512

(22) Filed: Aug. 18, 2022

(65) Prior Publication Data

US 2023/0136213 A1 May 4, 2023

(30) Foreign Application Priority Data

Oct. 28, 2021 (JP) .................. 2021-176546

(51) Int. Cl.
| | | |
|---|---|---|
| G08G 1/01 | (2006.01) | |
| B60R 99/00 | (2009.01) | |
| B60W 30/06 | (2006.01) | |
| B60W 30/095 | (2012.01) | |
| B60W 30/14 | (2006.01) | |

(Continued)

(52) U.S. Cl.
CPC .......... *B60W 30/146* (2013.01); *B60W 30/06* (2013.01); *B60W 30/0956* (2013.01); *B60W 40/02* (2013.01); *B60W 40/105* (2013.01); *B60W 40/12* (2013.01);

(Continued)

(58) Field of Classification Search
CPC ....... B60W 30/146; B60W 2554/4029; B60W 2552/53; B60W 2555/20; B60W 30/06; B60W 30/0956; B60W 40/02; B60W 40/105; B60W 40/12; B60W 2554/406
See application file for complete search history.

(56) References Cited

U.S. PATENT DOCUMENTS

2019/0265063 A1\* 8/2019 Shankaraiah ...... G01C 21/3484
2020/0317188 A1\* 10/2020 Lai ......................... G06V 20/58

FOREIGN PATENT DOCUMENTS

JP          2019099024 A   \* 12/2017  ............. B60R 21/00

OTHER PUBLICATIONS

Machine Translation—JP2019099024A—Makino et al. (Year: 2017).\*
Machine Translation of Foreign Reference: JP2019099024A—Makino et al. (Year: 2017).\*

\* cited by examiner

*Primary Examiner* — Scott A Browne
*Assistant Examiner* — Rami Nabih Bedewi
(74) *Attorney, Agent, or Firm* — Sughrue Mion, PLLC

(57) ABSTRACT

An upper-limit speed of a vehicle in automatic parking control is set, and the vehicle is caused to park automatically in a parking space at a vehicle speed equal to or lower than the set upper-limit speed. In this case, the upper-limit speed is set according to a vehicle body size of the vehicle, and the upper-limit speed is lower when the vehicle body size of the vehicle is greater than a preset size than when the vehicle body size of the vehicle is less than the preset size.

10 Claims, 9 Drawing Sheets

(51) Int. Cl.
*B60W 40/02* (2006.01)
*B60W 40/105* (2012.01)
*B60W 40/12* (2012.01)
*G08G 1/015* (2006.01)
*G08G 1/16* (2006.01)

(52) U.S. Cl.
CPC . *B60W 2552/53* (2020.02); *B60W 2554/4029* (2020.02); *B60W 2554/406* (2020.02); *B60W 2555/20* (2020.02)

AUTOMATIC PARKING SYSTEM, AUTOMATIC PARKING METHOD, AND STORAGE MEDIUM FOR SETTING VEHICLE SPEED UPPER-LIMIT DURING AUTOMATIC PARKING CONTROL

CROSS-REFERENCE TO RELATED APPLICATION

This application claims priority to Japanese Patent Application No. 2021-176546 filed on Oct. 28, 2021, incorporated herein by reference in its entirety.

BACKGROUND

1. Technical Field

The disclosure relates to an automatic parking system, an automatic parking method, and a storage medium.

2. Description of Related Art

A parking support device that performs automatic parking control for allowing a vehicle to park automatically in a parking space and adjusts an upper-limit speed of the vehicle in automatic parking control while ascertaining whether circumstances of the vehicle are safe at the time of automatic parking control is known (for example, see Japanese Unexamined Patent Application Publication No. 2019-99024 (JP 2019-99024 A)).

SUMMARY

However, in such a parking support device, a vehicle body size of a host vehicle that affects safety in automatic parking control is not considered at all.

Therefore, according to an aspect of the disclosure, there is provided an automatic parking system including: an automatic parking controller configured to perform automatic parking control for automatically parking a vehicle in a parking space; and an upper-limit speed setter configured to set an upper-limit speed of the vehicle in the automatic parking control, wherein the automatic parking controller is configured to perform automatic parking control for automatically parking the vehicle in a parking space at a vehicle speed which is equal to or lower than the upper-limit speed set by the upper-limit speed setter, and the upper-limit speed setter is configured to set the upper-limit speed according to a vehicle body size of the vehicle such that the upper-limit speed is lower when the vehicle body size of the vehicle is greater than a preset size than when the vehicle body size of the vehicle is less than the preset size.

According to another aspect of the disclosure, there is provided an automatic parking method including: setting an upper-limit speed of a vehicle in automatic parking control such that the upper-limit speed is lower when a vehicle body size of the vehicle is greater than a preset size than when the vehicle body size of the vehicle is less than the preset size; and performing automatic parking control for automatically parking the vehicle in a parking space at a vehicle speed which is equal to or lower than the set upper-limit speed.

According to another aspect of the disclosure, there is provided a storage medium storing a program causing a computer to perform: setting an upper-limit speed of a vehicle in automatic parking control such that the upper-limit speed is lower when a vehicle body size of the vehicle is greater than a preset size than when the vehicle body size of the vehicle is less than the preset size; and automatically parking the vehicle in a parking space at a vehicle speed which is equal to or lower than the set upper-limit speed.

It is possible to reduce a degree of contact risk of a vehicle with another object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
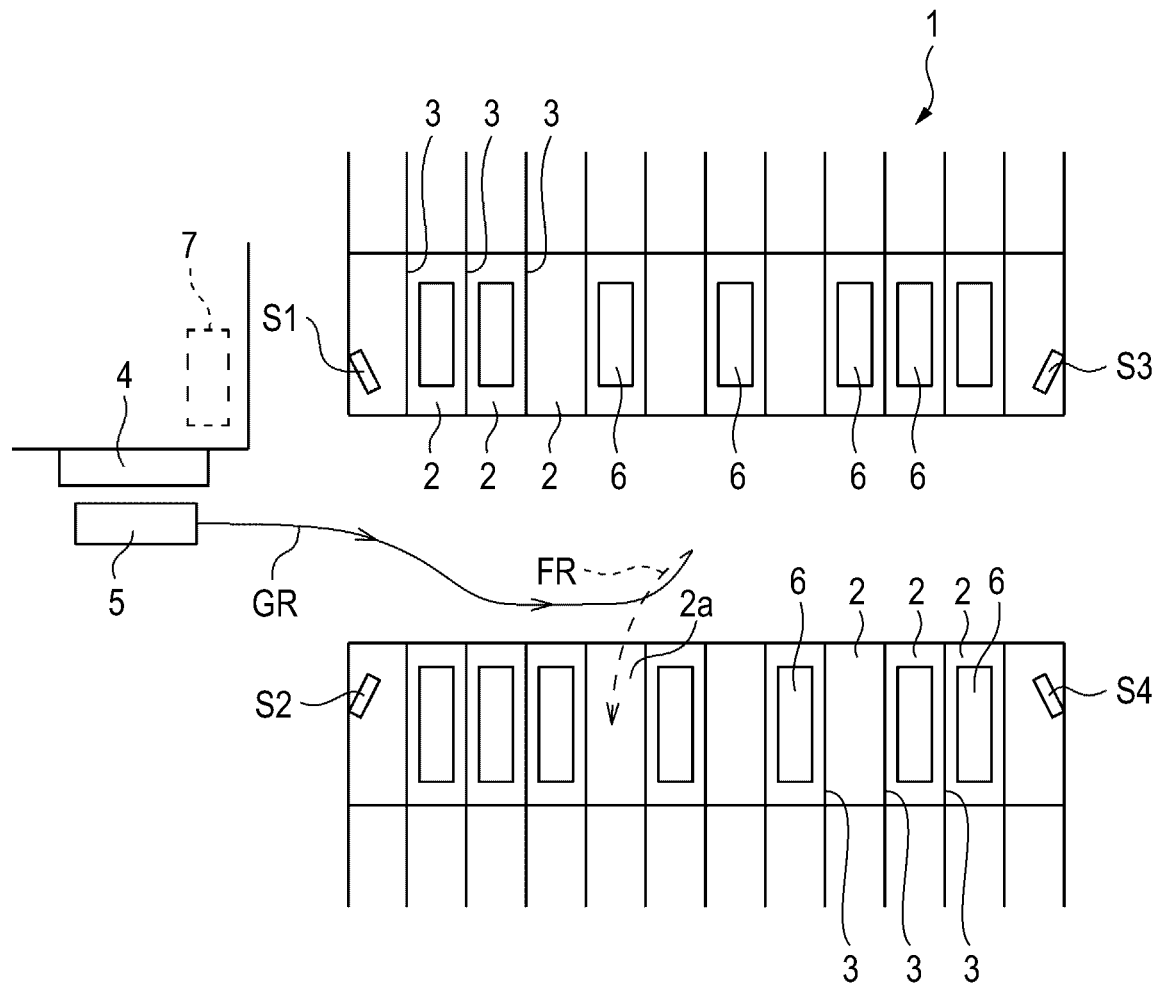
FIG. 1 is a plan view schematically illustrating an example of an automatic parking lot.
Figure 2:
FIG. 2 is a side view of the automatic parking lot illustrated in FIG. 1.

FIG. 1 is a plan view schematically illustrating a part of an automatic parking lot. FIG. 2 is a side view of the automatic parking lot illustrated in FIG. 1. Referring to FIGS. 1 and 2, reference sign 1 denotes a parking lot, reference sign 2 denotes a plurality of parking spaces, reference sign 3 denotes a parking frame of a parking space 2, reference sign 4 denotes a boarding/alighting platform, reference sign 5 denotes an automated-driving vehicle stopped in the boarding/alighting platform 4, and reference sign 6 denotes an automated-driving vehicle parked in a parking space 2 in the parking lot 1. In this parking lot 1, an automatic parking service, that is, an automatic valet parking service, of allowing an automated-driving vehicle 5 arriving at the boarding/alighting platform 4 to park in an available parking space 2 through automated driving is performed. On the other hand, in FIG. 1, reference sign 7 denotes a parking lot management server that performs the automatic parking service. The automatic parking lot can also allow a manually driven vehicle to park therein.

In the automatic parking lot, a plurality of infrastructure sensors is disposed to detect parking circumstances or the like of vehicles in the parking lot 1. FIGS. 1 and 2 illustrate a partial area in the parking lot 1. In the example illustrated in FIGS. 1 and 2, four infrastructure sensors S1, S2, S3, and S4 are provided to detect a state of the partial area of the automatic parking lot. Cameras are generally used as the infrastructure sensors S1, S2, S3, and S4, and image signals captured by the infrastructure sensors S1, S2, S3, and S4 are transmitted to the parking lot management server 7.

Figure 3:
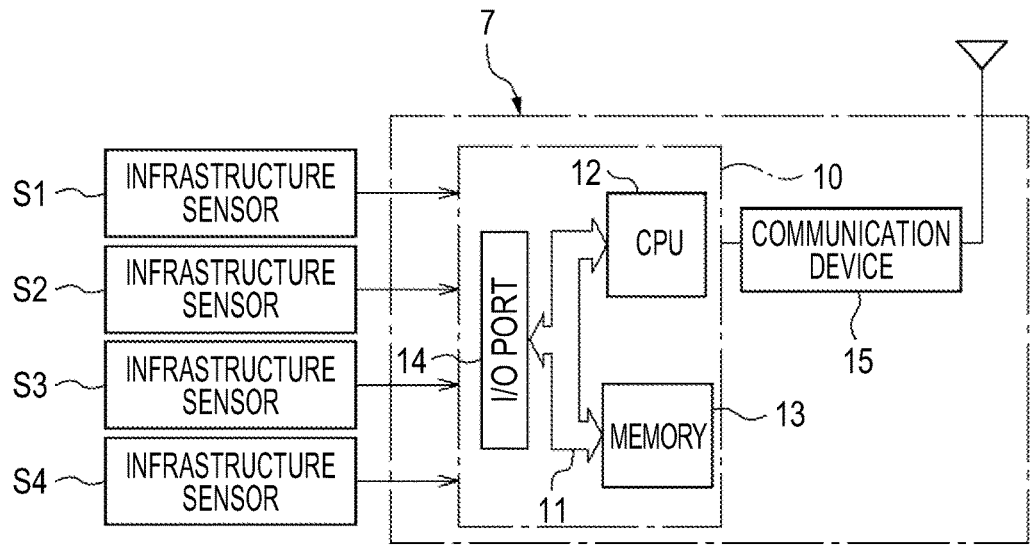
FIG. 3 is a diagram schematically illustrating a parking lot management server.

FIG. 3 illustrates the parking lot management server 7 illustrated in FIG. 1. As illustrated in FIG. 3, an electronic control unit 10 is provided in the parking lot management server 7. The electronic control unit 10 is constituted by a digital computer and includes a microprocessor (CPU) 12, a memory 13 including a ROM and a RAM, and an input/output port 14 which are connected to each other via a bidirectional bus 11. As illustrated in FIG. 3, the image signals captured by the infrastructure sensors S1, S2, S3, and S4 are input to the electronic control unit 10. Map data of the parking lot 1 is stored in the memory 13 of the electronic control unit 10.

Figure 4:
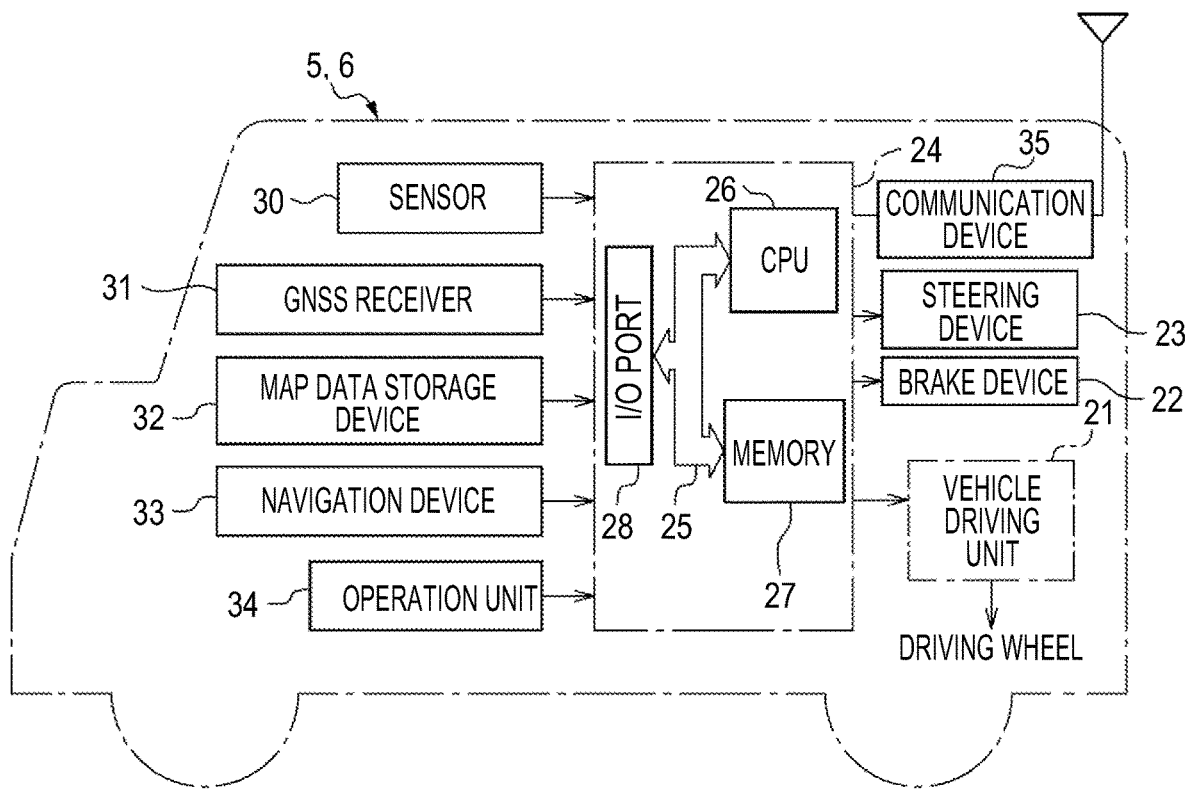
FIG. 4 is a diagram schematically illustrating an automated-driving vehicle.

FIG. 4 schematically illustrates an example of the automated-driving vehicle 5 or 6. Referring to FIG. 4, reference sign 21 denotes a vehicle driving unit that applies driving power to driving wheels of the vehicle 5 or 6, reference sign 22 denotes a brake device that brakes the vehicle 5 or 6, reference sign 23 denotes a steering device that steers the vehicle 5 or 6, and reference sign 24 denotes an electronic control unit that is mounted in the vehicle 5 or 6. As illustrated in FIG. 4, the electronic control unit 24 is constituted by a digital computer and includes a microprocessor (CPU) 26, a memory 27 including a ROM and a RAM, and an input/output port 28 which are connected to each other via a bidirectional bus 25. In the example illustrated in FIG. 4, the vehicle driving unit 21 includes an electric motor that is driven by a secondary battery or an electric motor that is driven by a fuel cell, and driving of the driving wheels is controlled by the electric motor according to an output signal of the electronic control unit 24. Brake control of the vehicle 5 or 6 is performed by the brake device 22 according to an output signal of the electronic control unit 24, and steering control of the vehicle 5 or 6 is performed by the steering device 23 according to an output signal of the electronic control unit 24.

On the other hand, as illustrated in FIG. 4, various sensors 30 that are required for the vehicle 5 or 6 to perform automated driving and automatic parking, that is, sensors that detect a state of the vehicle 5 or 6 and circumstance sensors that detect circumstances of the vehicle 5 or 6, are installed in the vehicle 5 or 6. In this case, an acceleration sensor, a speed sensor, and a direction sensor are used as the sensors that detect the state of the vehicle 5 or 6, and onboard cameras that image a front view, side views, and a rear view of the vehicle 5 or 6, a LIDAR, a radar, and the like are used as the circumstance sensors that detect the circumstances of the vehicle 5 or 6.

A global navigation satellite system (GNSS) receiver 31, a map data storage device 32, a navigation device 33, and an operation unit 34 that is used to perform various operations are installed in the vehicle 5 or 6. The GNSS receiver 31 can detect a current location of the vehicle 5 or 6 (for example, latitude and longitude of the vehicle 5 or 6) based on information acquired from a plurality of artificial satellites. Accordingly, it is possible to acquire the current location of the vehicle 5 or 6 using the GNSS receiver 31. For example, a GPS receiver is used as the GNSS receiver 31. On the other hand, map data required for the vehicle 5 or 6 to perform automated driving and automatic parking, or the like is stored in the map data storage device 32. The sensors 30, the GNSS receiver 31, the map data storage device 32, the navigation device 33, and the operation unit 34 are connected to the electronic control unit 24. A communication device 35 that communicates with the parking lot management server 7 is mounted in the vehicle 5 or 6, and a communication device 15 that communicates with the vehicle 5 or 6 is provided in the parking lot management server 7 as illustrated in FIG. 3.

Figure 5:
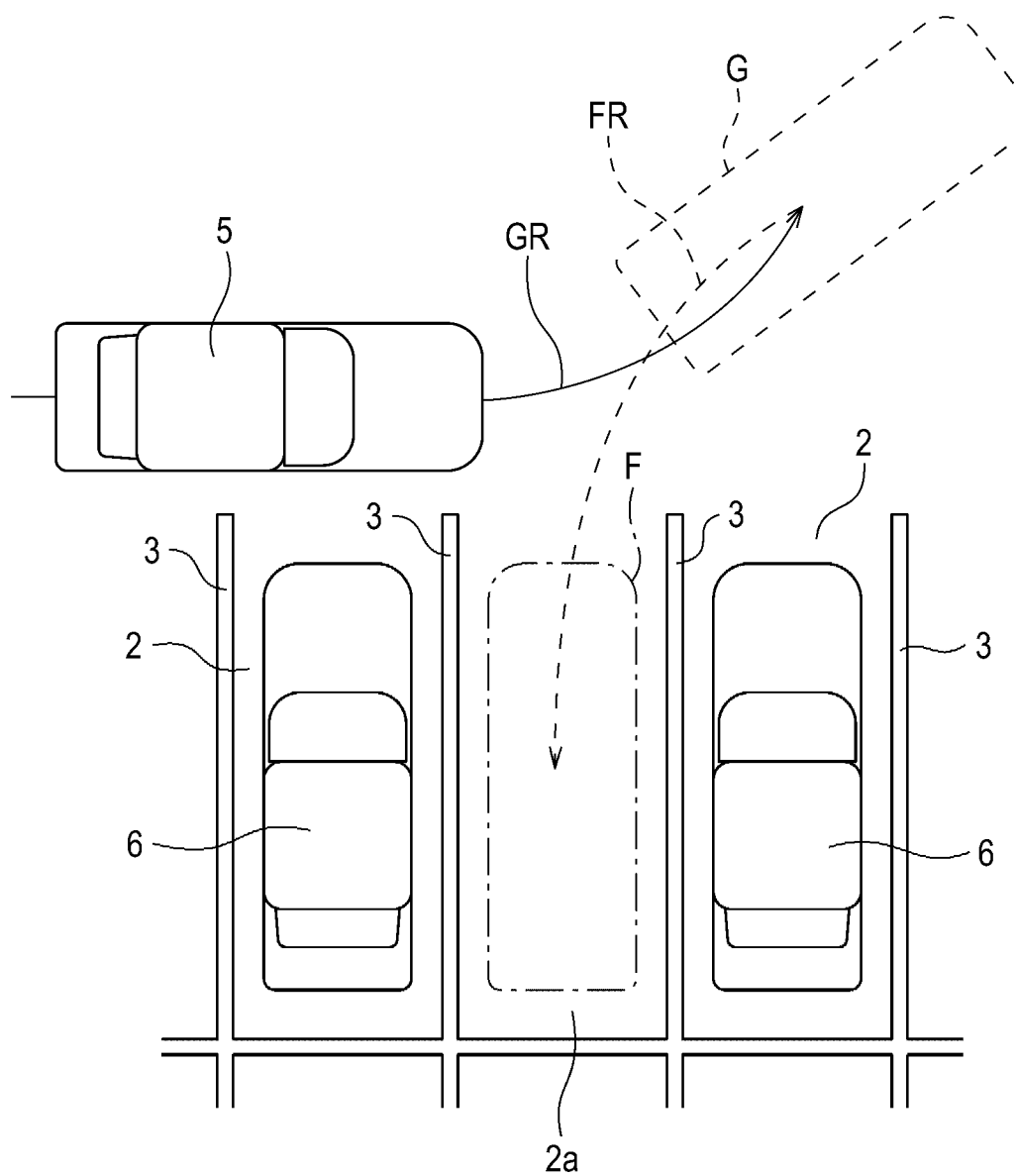
FIG. 5 is an enlarged view of a part of FIG. 1.

An example of the automatic parking system to which the disclosure is applied will be described below with reference to FIG. 1 and FIG. 5 which is a partially enlarged view of FIG. 1. In FIGS. 1 and 5, a case in which an automated-driving vehicle 5 arriving at the boarding/alighting platform 4 parks automatically in an available parking space 2 is illustrated. In this case, when the automated-driving vehicle 5 arrives at the boarding/alighting platform 4, for example, a user of the automated-driving vehicle 5 transmits an entrance request along with a vehicle ID for identifying the automated-driving vehicle 5 from the user's mobile terminal to the parking lot management server 7 via a communication network. When the entrance request is received, the parking lot management server 7 determines a parking space 2a at which the automated-driving vehicle 5 is to park out of empty parking spaces 2 and transmits information on a position of the parking space 2a and a destination to which the automated-driving vehicle 5 moves to the automated-driving vehicle 5. When this information is received, the automated-driving vehicle 5 starts automated driving based on the information and parks in the parking space 2a.

In this case, for example, the parking lot management server 7 determines a first destination G before the automated-driving vehicle 5 moves to the parking space 2a and a second destination F which is a final parking position of the automated-driving vehicle 5 as the destination to which the automated-driving vehicle 5 moves as indicated by a dotted line in FIG. 5, and the electronic control unit 24 of the automated-driving vehicle 5 sets a first travel route GR from the boarding/alighting platform 4 to the first destination G and a second travel route FR from the first destination G to the second destination F as indicated by arrows in FIGS. 1 and 5. When the first travel route GR and the second travel route FR are set, the automated-driving vehicle 5 moves forward to the first destination G along the first travel route GR and then moves rearward to the second destination F along the second travel route FR.

When such automatic parking control is performed, it is most important to minimize a degree of contact risk of the automated-driving vehicle 5 with another vehicle parked nearby, with a stationary object such as a structure, or with a mobile object such as another moving vehicle or a pedestrian when the automatic parking control is being performed. On the other hand, the degree of contact risk changes greatly for various factors, and there is a plurality of factors affecting the degree of contact risk when automatic parking control is being performed. For example, when a degree of congestion of other vehicles or pedestrians around the automated-driving vehicle 5 increases, the degree of contact risk increases. Accordingly, the degree of congestion around the automated-driving vehicle 5 is one factor affecting the degree of contact risk.

When a person around the automated-driving vehicle 5 is a child, the degree of contact risk increases. Accordingly, a child around the automated-driving vehicle 5 is one factor affecting the degree of contact risk. When a vehicle body size of another vehicle around the automated-driving vehicle 5 increases, the degree of contact risk increases. Accordingly, the vehicle body size of another vehicle around the automated-driving vehicle 5 is one factor affecting the degree of contact risk. When a blind spot which cannot be detected by the sensors is present around the automated-driving vehicle 5, the degree of contact risk increases. Accordingly, the presence of a blind spot is one factor affecting the degree of contact risk.

When a crosswalk is present around the automated-driving vehicle 5, the degree of contact risk increases. Accordingly, the presence of a crosswalk is one factor affecting the degree of contact risk. When the weather around the automated-driving vehicle 5 is bad weather such as rain, snow, or strong wind, identification is difficult and thus the degree of contact risk increases. Accordingly, the weather around the automated-driving vehicle 5 is one factor affecting the degree of contact risk.

In this way, there is a plurality of factors affecting the degree of contact risk. In addition thereto, a vehicle body size of the automated-driving vehicle 5 is also one factor affecting the degree of contact risk. In this case, when the vehicle body size of the automated-driving vehicle 5 increases, the degree of contact risk increases and thus the vehicle body size of the automated-driving vehicle 5 also serves as one factor affecting the degree of contact risk. A most effective method of decreasing the degree of contact risk when the degree of contact risk has increased in this way is to decrease an upper-limit speed of the automated-driving vehicle 5 when automatic parking control is being performed. Therefore, in an embodiment of the disclosure, the upper-limit speed of the automated-driving vehicle 5 is decreased when the degree of contact risk is greater than a preset degree threshold while automatic parking control is being performed.

Figure 6:
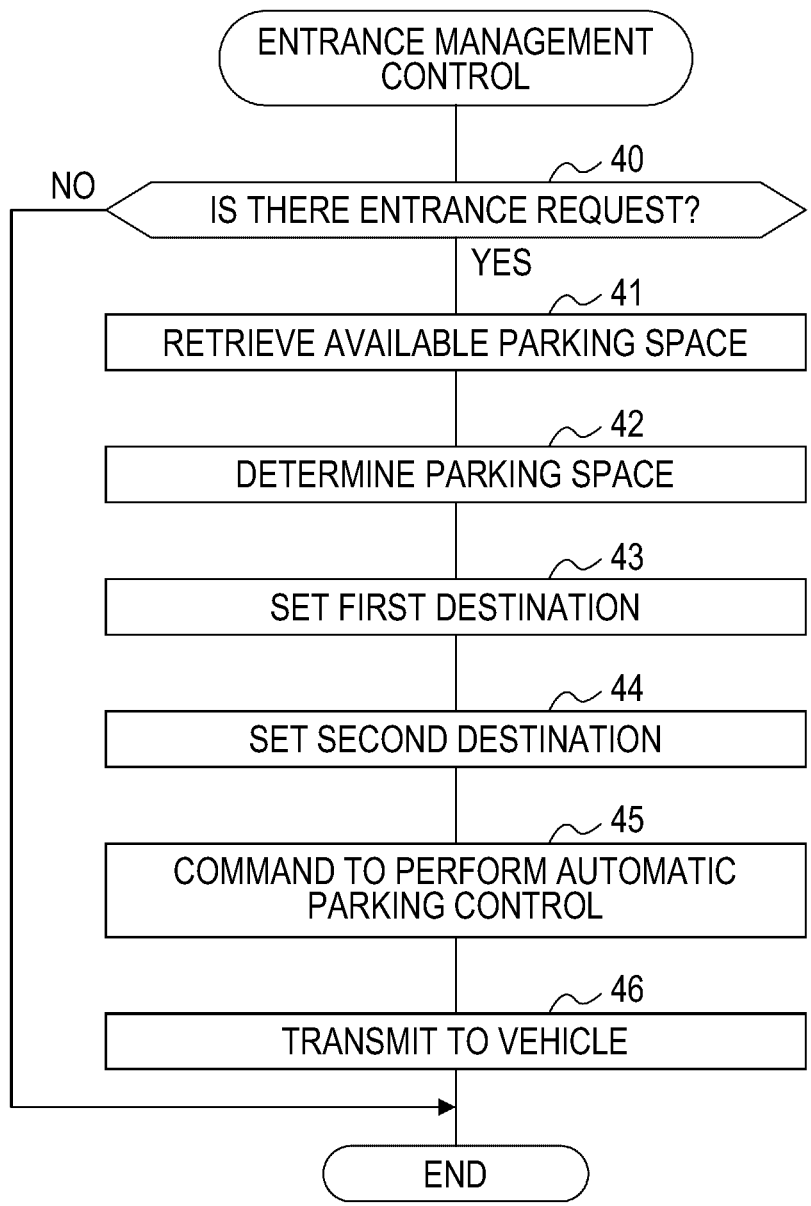
FIG. 6 is a flowchart illustrating a routine of performing entrance management control in an automatic parking lot.

An embodiment of the disclosure will be described below with reference to FIGS. 6 to 11. FIG. 6 will be described first. FIG. 6 illustrates a management control routine of entrance in an automatic parking lot which is performed by the electronic control unit 10 of the parking lot management server 7. Referring to FIG. 6, first, in Step 40, it is determined whether an entrance request has been received. When it is determined that an entrance request has not been received, this cycle of the routine ends. On the other hand, when it is determined that an entrance request has been received, an empty parking space 2 is retrieved based on the image signals captured by the infrastructure sensors S1, S2, S3, and S4 and the map data of the parking lot 1 stored in the memory 13 in Step 41.

Subsequently, in Step 42, a parking space 2a (FIGS. 1 and 5) for the automated-driving vehicle 5 having transmitted the entrance request is determined out of the empty parking spaces 2. Subsequently, a first destination G (FIG. 5) for the automated-driving vehicle 5 having transmitted the entrance request is set in Step 43, and then a second destination F (FIG. 5) for the automated-driving vehicle 5 having transmitted the entrance request is set in Step 44. The first destination G and the second destination F are set in advance, for example, for each parking space 2 and are stored in advance in the memory 13 of the electronic control unit 10. Subsequently, in Step 45, a command to perform automatic parking control is issued, and the command to perform automatic parking control along with the first destination G and the second destination F is transmitted to the automated-driving vehicle 5.

Figure 7:
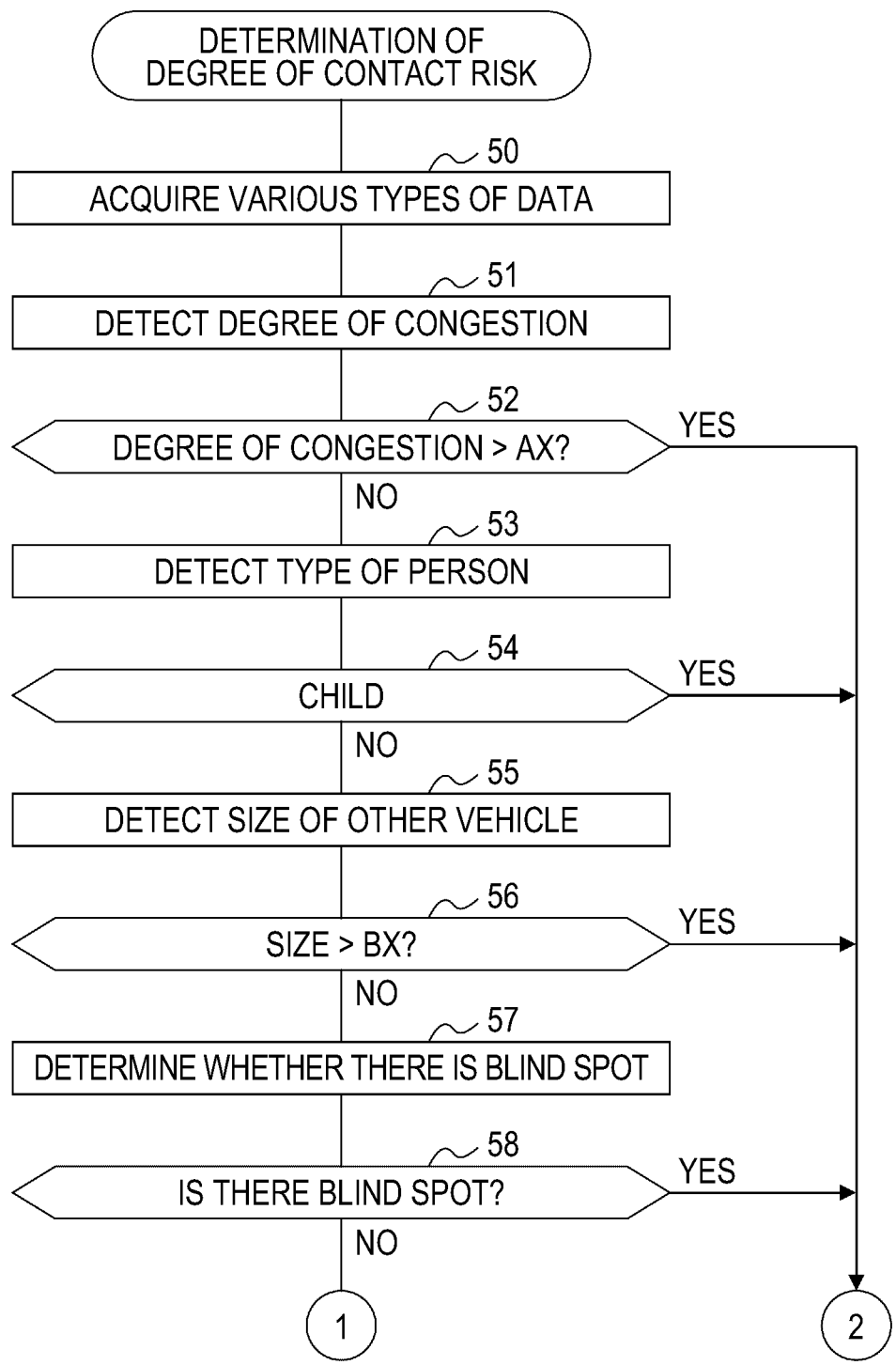
FIG. 7 is a flowchart illustrating a routine of determining a degree of contact risk.
Figure 8:
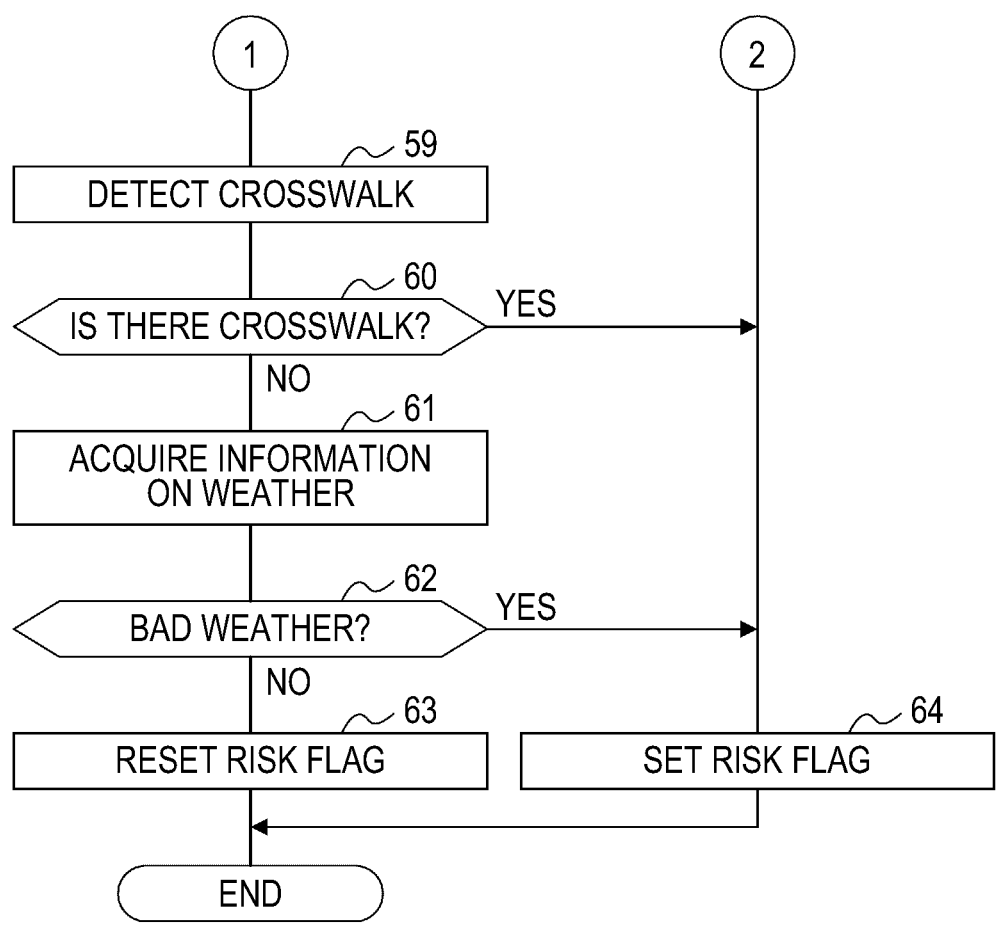
FIG. 8 is a flowchart illustrating a routine of determining a degree of contact risk.
Figure 9:
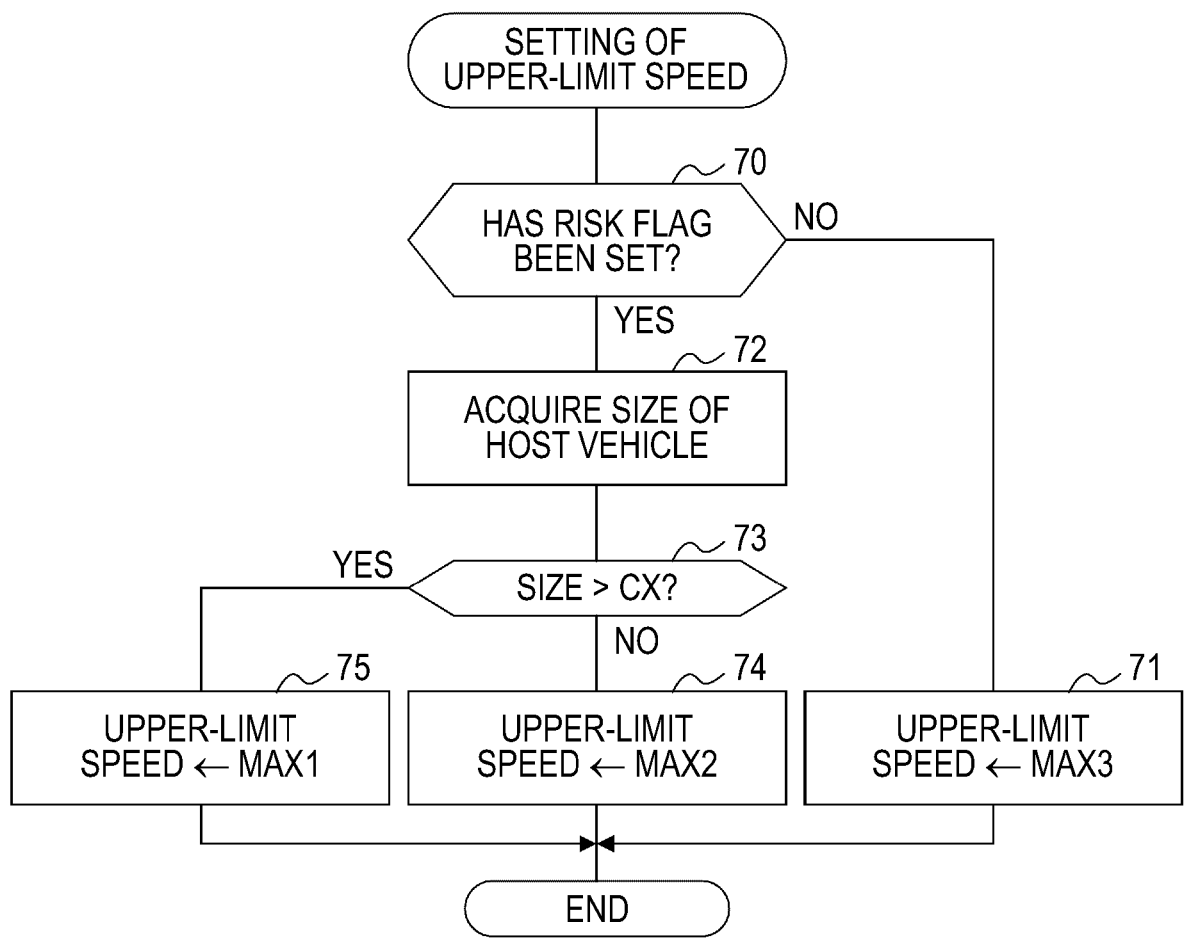
FIG. 9 is a flowchart illustrating a routine of setting an upper-limit speed.
Figure 10:
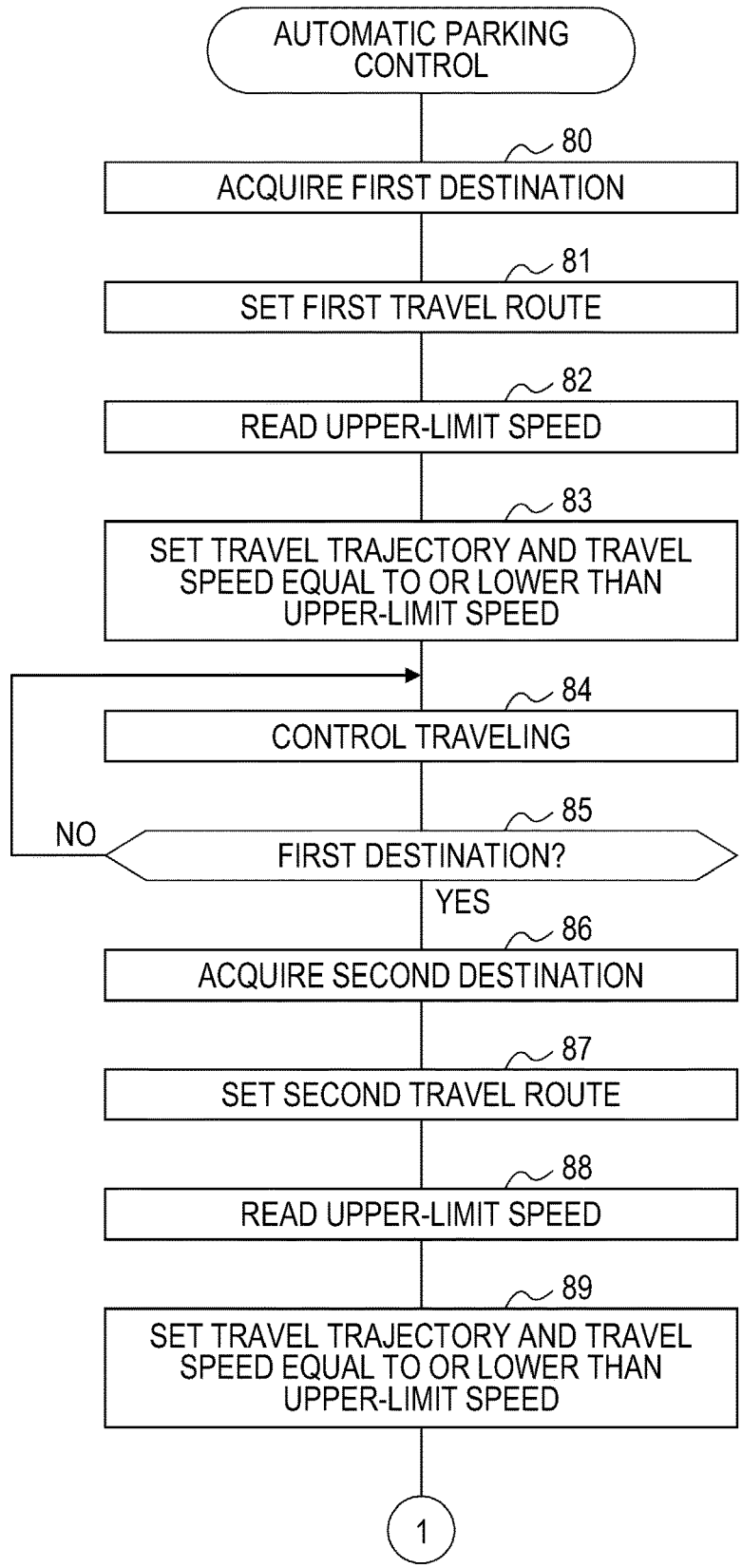
FIG. 10 is a flowchart illustrating a routine of performing automatic parking control.
Figure 11:
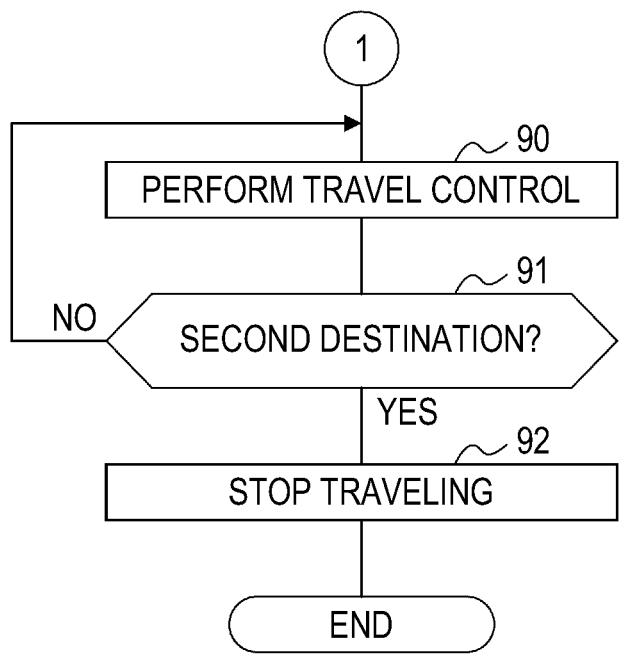
FIG. 11 is a flowchart illustrating a routine of performing automatic parking control.

When the automated-driving vehicle 5 receives the command to perform automatic parking control, the electronic control unit 24 of the automated-driving vehicle 5 repeatedly performs a routine of determining a degree of contact risk which is illustrated in FIGS. 7 and 8, repeatedly performs a routine of setting an upper-limit speed which is illustrated in FIG. 9, and performs an automatic parking control routine which is illustrated in FIGS. 10 and 11.

First, referring to FIGS. 7 and 8 illustrating the routine of determining a degree of contact risk, in Step 50, image signals captured by the infrastructure sensors S1, S2, S3, and S4 and the map data of the parking lot 1 stored in the memory 13 of the electronic control unit 10 are acquired in addition to detection signals from the circumstance sensors such as the onboard cameras imaging a front view, side views, and a rear view of the automated-driving vehicle 5, the LIDAR, and the radar. In this case, circumstances of the automated-driving vehicle 5 can be detected from the acquired detection signals and image signals, and thus the circumstance sensors and the infrastructure sensors S1, S2, S3, and S4 constitute a circumstance detector that detects circumstances of the automated-driving vehicle 5.

When various types of data are acquired in Step 50, a degree of congestion of other vehicles or pedestrians around the automated-driving vehicle 5 is detected based on the data acquired in Step 50, that is, based on the circumstances detected by the circumstance detector that detects the circumstances of the automated-driving vehicle 5, in Step 51. In this case, for example, a sum of the number of other vehicles around the automated-driving vehicle 5 and the number of persons around the automated-driving vehicle 5 is the degree of congestion. Subsequently, in Step 52, it is determined whether the degree of congestion is greater than a preset threshold AX. When the degree of congestion is greater than the preset threshold AX, it is determined that the degree of contact risk is greater than the preset degree threshold, and a risk flag is set in Step 64. Subsequently, this cycle of the routine ends. When the risk flag is set, the upper-limit speed of the automated-driving vehicle 5 decreases as will be described later. On the other hand, when it is determined in Step 52 that the degree of congestion is not greater than the preset threshold AX, the routine proceeds to Step 53.

In Step 53, a person around the automated-driving vehicle 5 is detected based on the various types of data acquired in Step 50, that is, based on the circumstances detected by the circumstance detector that detects circumstances of the automated-driving vehicle 5. Subsequently, in Step 54, it is determined whether the person around the automated-driving vehicle 5 is a child. When the person around the automated-driving vehicle 5 is a child, it is determined that the degree of contact risk is greater than the preset degree threshold, and the risk flag is set in Step 64. Subsequently, this cycle of the routine ends. On the other hand, when it is determined in Step 54 that the person around the automated-driving vehicle 5 is not a child, the routine proceeds to Step 55.

In Step 55, a vehicle body size of another vehicle around the automated-driving vehicle 5 is detected based on the various types of data acquired in Step 50, that is, based on the circumstances detected by the circumstance detector that detects circumstances of the automated-driving vehicle 5. Subsequently, in Step 56, it is determined whether the vehicle body size of the other vehicle around the automated-driving vehicle 5 is greater than a preset size BX. When the vehicle body size of the other vehicle around the automated-driving vehicle 5 is greater than the preset size BX, it is determined that the degree of contact risk is greater than the preset degree threshold, and the risk flag is set in Step 64. Then, this cycle of the routine ends. On the other hand, when it is determined in Step 56 that the vehicle body size of the other vehicle around the automated-driving vehicle 5 is not greater than the preset size BX, the routine proceeds to Step 57.

In Step 57, it is determined whether a blind spot which cannot be detected by the circumstance detector is present around the automated-driving vehicle 5 is detected based on the various types of data acquired in Step 50, that is, based on the circumstances detected by the circumstance detector that detects circumstances of the automated-driving vehicle 5. Subsequently, in Step 58, it is determined whether a blind spot is present around the automated-driving vehicle 5. When a blind spot is present around the automated-driving vehicle 5, it is determined that the degree of contact risk is greater than the preset degree threshold, and the risk flag is set in Step 64. Then, this cycle of the routine ends. On the other hand, when it is determined in Step 58 that a blind spot is not present around the automated-driving vehicle 5, the routine proceeds to Step 59.

In Step 59, a crosswalk around the automated-driving vehicle 5 is detected based on the various types of data acquired in Step 50, that is, based on the circumstances detected by the circumstance detector that detects circumstances of the automated-driving vehicle 5. Subsequently, in Step 60, it is determined whether a crosswalk is present around the automated-driving vehicle 5. When a crosswalk is present around the automated-driving vehicle 5, it is determined that the degree of contact risk is greater than the preset degree threshold, and the risk flag is set in Step 64. Then, this cycle of the routine ends. On the other hand, when it is determined in Step 60 that a crosswalk is not present around the automated-driving vehicle 5, the routine proceeds to Step 61.

In Step 61, information on weather around the automated-driving vehicle 5 which is detected using a weather detector such as a raindrop detector or which is received from a weather information company is acquired. In this case, a weather forecast may be used as the information on weather. Subsequently, in Step 62, it is determined whether the weather around the automated-driving vehicle 5 is preset bad weather. When the weather around the automated-driving vehicle 5 is the preset bad weather, it is determined that the degree of contact risk is greater than the preset degree threshold, and the risk flag is set in Step 64. Then, this cycle of the routine ends. On the other hand, when it is determined in Step 62 that the weather around the automated-driving vehicle 5 is not the preset bad weather, the risk flag is reset in Step 63. Then, this cycle of the routine ends.

The routine of setting an upper-limit speed which is repeatedly performed by the electronic control unit 24 of the automated-driving vehicle 5 will be described below with reference to FIG. 9. Referring to FIG. 9, in Step 70, first, it is determined whether the risk flag is set. When it is determined that the risk flag is not set, that is, when the degree of contact risk is not greater than the preset degree threshold, the upper-limit speed is set to a preset upper-limit speed MAX3 in Step 71. Then, this cycle of the routine ends.

On the other hand, when it is determined in Step 70 that the risk flag is set, the vehicle body size of the host vehicle is acquired in Step 72. Subsequently, in Step 73, it is determined whether the vehicle body size of the host vehicle is greater than a preset size CX. When it is determined that the vehicle body size of the host vehicle is not greater than the preset size CX, the upper-limit speed is set to a preset upper-limit speed MAX2 which is lower than the upper-limit speed MAX3 in Step 74. Then, this cycle of the routine ends. On the other hand, when it is determined that the vehicle body size of the host vehicle is greater than the preset size CX, the upper-limit speed is set to a preset upper-limit speed MAX1 which is lower than the upper-limit speed MAX2 in Step 75. Then, this cycle of the routine ends.

The automatic parking control routine which is performed by the electronic control unit 24 of the automated-driving vehicle 5 will be described below with reference to FIGS. 10 and 11. Referring to FIGS. 10 and 11, first, in Step 80, a first destination G transmitted from the parking lot management server 7 is acquired. In this case, the first destination G may be set based on the circumstances detected by the circumstance detector that detects circumstances of the automated-driving vehicle 5 by the electronic control unit 24 of the automated-driving vehicle 5. Subsequently, in Step 81, the map data of the parking lot 1 stored in the memory 13 of the electronic control unit 10 of the parking lot management server 7 is read, and a first travel route GR indicating a passage on which the automated-driving vehicle 5 has to move from the boarding/alighting platform 4 to the first destination G is set based on the map data. In this case, the first travel route GR may be set by the parking lot management server 7.

Subsequently, in Step 82, one upper-limit speed of the upper-limit speed MAX1, the upper-limit speed MAX2, and the upper-limit speed MAX3 calculated in the routine of setting an upper-limit speed which is illustrated in FIG. 9 is read. Then, in Step 83, a travel trajectory of the automated-driving vehicle 5 within a predetermined distance from the current location along which the automated-driving vehicle 5 can travel without contacting another vehicle or a pedestrian in a travel passage of the automated-driving vehicle 5 is determined based on the read map data. In Step 83, a travel speed equal to or lower than the upper-limit speed when the automated-driving vehicle 5 travels on the travel trajectory is set. Subsequently, in Step 84, travel control of the automated-driving vehicle 5 is performed such that the automated-driving vehicle 5 does not contact another vehicle or a pedestrian based on the results of detection from the circumstance sensors such as the cameras imaging a front view and the like of the automated-driving vehicle 5, the LIDAR, and the radar at the travel speed set to be equal to or lower than the upper-limit speed along the set travel trajectory. Then, in Step 85, it is determined that the automated-driving vehicle 5 has reached the first destination G. When it is determined that the automated-driving vehicle 5 has not reached the first destination G, the routine returns to Step 84 and automated driving of the automated-driving vehicle 5 is continued. On the other hand, when it is determined in Step 85 that the automated-driving vehicle 5 has reached the first destination G, the routine proceeds to Step 86.

In Step 86, a second destination F transmitted from the parking lot management server 7 is acquired. In this case, the second destination F may also be set based on the circumstances detected by the circumstance detector that detects circumstances of the automated-driving vehicle 5 by the electronic control unit 24 of the automated-driving vehicle 5. Subsequently, in Step 87, the map data of the parking lot 1 stored in the memory 13 of the electronic control unit 10 of the parking lot management server 7 is read, and a second travel route FR from the first destination G to the second destination F is set based on the map data. In this case, the second travel route FR may be set by the parking lot management server 7.

Then, in Step 88, one upper-limit speed of the upper-limit speed MAX1, the upper-limit speed MAX2, and the upper-limit speed MAX3 calculated in the routine of setting an upper-limit speed illustrated in FIG. 9 is read. Subsequently, in Step 89, a travel trajectory of the automated-driving vehicle 5 and a travel speed equal to or lower than the upper-limit speed are set based on the read map data such that the automated-driving vehicle 5 does not contact another vehicle or a pedestrian. Then, in Step 90, travel control of the automated-driving vehicle 5 is performed such that the automated-driving vehicle 5 does not contact another vehicle or a pedestrian based on the results of detection from the circumstance sensors such as the cameras imaging a front view and the like of the automated-driving vehicle 5, the LIDAR, and the radar at the travel speed set to be equal to or lower than the upper-limit speed along the set travel trajectory. Subsequently, in Step 91, it is determined whether the automated-driving vehicle 5 has reached the second destination F. When it is determined that the automated-driving vehicle 5 has not reached the second destination F, the routine returns to Step 90 and automated driving of the automated-driving vehicle 5 is continued. On the other hand, when it is determined in Step 91 that the automated-driving vehicle 5 has reached the second destination F, that is, when a parking operation of the automated-driving vehicle 5 has been completed, the routine proceeds to Step 92, and traveling of the automated-driving vehicle 5 is stopped.

While an embodiment of the disclosure has been described above with reference to an example in which the automated-driving vehicle 5 is automatically parked in an automatic parking lot, the disclosure can also be applied to a case in which a manually driven vehicle having an automatic parking function is parked in a general parking space in which a manually driven vehicle is parked. In this case, when a manually driven vehicle is parked in the parking space 2a in FIG. 5 using the automatic parking function, an automatic parking operation of the manually driven vehicle using the automatic parking function is performed by temporarily stopping the manually driven vehicle at a position denoted by reference sign 5 in FIG. 5 and causing an electronic control unit of the manually driven vehicle to perform the routine of determining a degree of contact risk illustrated in FIGS. 7 and 8, the routine of setting an upper-limit speed illustrated in FIG. 9, and the automatic parking control routine illustrated in FIGS. 10 and 11.

Figure 12:
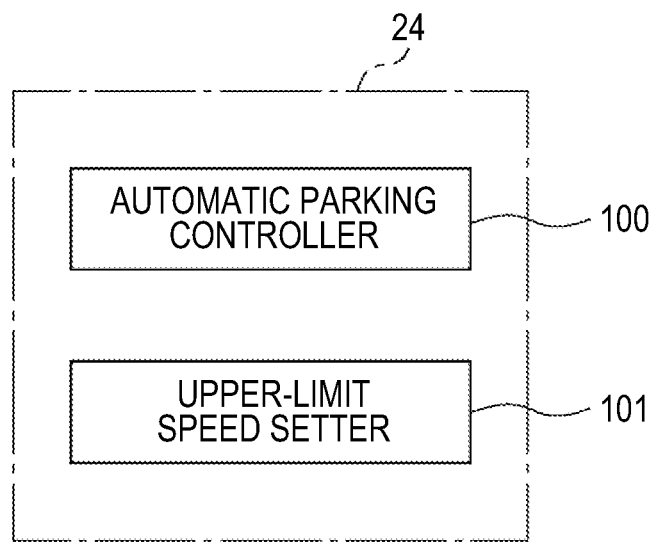
FIG. 12 is a diagram illustrating a functional configuration of an embodiment of the disclosure.

According to an embodiment of the disclosure, as illustrated in the functional configuration diagram of FIG. 12, the automatic parking system includes the automatic parking controller 100 configured to perform automatic parking control for automatically parking a vehicle in a parking space and the upper-limit speed setter 101 configured to set an upper-limit speed of the vehicle in the automatic parking control. The automatic parking controller 100 is configured to perform automatic parking control for automatically parking the vehicle in a parking space at a vehicle speed which is equal to or lower than the upper-limit speed set by the upper-limit speed setter 101. Here, the upper-limit speed setter 101 is configured to set the upper-limit speed according to a vehicle body size of the vehicle such that the upper-limit speed is lower when the vehicle body size of the vehicle is greater than a preset size than when the vehicle body size of the vehicle is less than the preset size. In this case, the electronic control unit 24 of the vehicle constitutes the automatic parking controller 100 and the upper-limit speed setter 101.

In the embodiment of the disclosure, the automatic parking system includes the circumstance detector configured to detect circumstances of the vehicle and the risk determiner configured to determine a degree of contact risk of the vehicle with an object other than the vehicle based on the circumstances of the vehicle detected by the circumstance detector. The upper-limit speed setter 101 is configured to set the upper-limit speed according to the vehicle body size of the vehicle when it is determined that the degree of contact risk is greater than a preset degree threshold. In this case, the electronic control unit 24 of the vehicle constitutes the risk determiner.

In the embodiment of the disclosure, the upper-limit speed setter 101 is configured to set the upper-limit speed according to the vehicle body size of the vehicle and the degree of contact risk such that the upper-limit speed is lower when it is determined that the degree of contact risk is greater than the preset degree threshold than when it is determined that the degree of contact risk is not greater than the preset degree threshold. The upper-limit speed setter 101 is configured to set the upper-limit speed according to the vehicle body size of the vehicle when it is determined that the degree of contact risk is greater than the preset degree threshold such that the upper-limit speed is lower when the vehicle body size of the vehicle is greater than a preset size than when the vehicle body size of the vehicle is less than the preset size.

According to an embodiment of the disclosure, there is provided an automatic parking method including: setting an upper-limit speed of a vehicle in automatic parking control such that the upper-limit speed is lower when a vehicle body size of the vehicle is greater than a preset size than when the vehicle body size of the vehicle is less than the preset size; and performing automatic parking control for automatically parking the vehicle in a parking space at a vehicle speed which is equal to or lower than the set upper-limit speed.

According to an embodiment of the disclosure, there is provided a program causing a computer to perform: setting an upper-limit speed of a vehicle in automatic parking control such that the upper-limit speed is lower when a vehicle body size of the vehicle is greater than a preset size than when the vehicle body size of the vehicle is less than the preset size; and automatically parking the vehicle in a parking space at a vehicle speed which is equal to or lower than the set upper-limit speed. The program is an example of a storage medium.

What is claimed is:

1. An automatic parking system comprising: a sensor configured to detect circumstances around a vehicle, and a processor configured to set an upper-limit speed of the vehicle in the automatic parking control, wherein the processor is configured to:
   set the upper-limit speed according to a vehicle body size of the vehicle such that the upper-limit speed is lower when the vehicle body size of the vehicle is greater than a preset size than when the vehicle body size of the vehicle is less than the preset size,
   determine a degree of contact risk of the vehicle with an object other than the vehicle based on the circumstances of the vehicle detected by the sensor,
   set the upper-limit speed according to the vehicle body size of the vehicle when it is determined that the degree of contact risk is greater than a preset degree threshold,
   set the upper-limit speed according to the vehicle body size of the vehicle and the degree of contact risk such that the upper-limit speed is lower when it is determined that the degree of contact risk is greater than the preset degree threshold than when it is determined that the degree of contact risk is not greater than the preset degree threshold,
   set the upper-limit speed according to the vehicle body size of the vehicle when it is determined that the degree of contact risk is greater than the preset degree threshold such that the upper-limit speed is lower when the vehicle body size of the vehicle is greater than a preset size than when the vehicle body size of the vehicle is less than the preset size; and perform automatic parking control for automatically parking the vehicle in a parking space at a vehicle speed which is equal to or lower than the upper-limit speed set by the processor.

2. The automatic parking system according to claim 1, wherein the processor is configured to determine that the contact risk degree is greater than the first threshold in a case where the sensor detects a congestion degree around the vehicle based on the circumstances around the vehicle detected by the sensor and the congestion degree is greater than a second threshold.

3. The automatic parking system according to claim 1, wherein: the sensor is a camera configured to capture the circumstances around the vehicle; and
the processor is configured to
analyze whether the captured circumstances around the vehicle include a presence of a child, and
determine that the contact risk degree is greater than the first threshold in a case where the child is present around the vehicle based on a result of analyzing the captured circumstances around the vehicle.

4. The automatic parking system according to claim 1, wherein the processor is configured to determine that the contact risk degree is greater than the first threshold in a case where the sensor detects a vehicle size of another vehicle around the vehicle based on the circumstances around the vehicle detected by the sensor and the vehicle size of the other vehicle is greater than a second preset size.

5. The automatic parking system according to claim 1, wherein the processor is configured to determine that the contact risk degree is greater than the first threshold in a case where the processor determines whether a blind spot which is unable to be detected by the sensor is present around the vehicle based on the circumstances around the vehicle detected by the sensor and the blind spot is present around the vehicle.

6. The automatic parking system according to claim 1, wherein the processor is configured to determine that the contact risk degree is greater than the first threshold in a case where the sensor detects a crosswalk around the vehicle based on the circumstances around the vehicle detected by the sensor and the crosswalk is present around the vehicle.

7. The automatic parking system according to claim 1, wherein the processor is configured to determine that the contact risk degree is greater than the first threshold in a case where weather around the vehicle is acquired based on the circumstances around the vehicle detected by the sensor and weather around the vehicle is preset bad weather.

8. The automatic parking system according to claim 1, wherein the sensor is at least one of a camera, a LIDAR, and a radar.

9. An automatic parking method comprising: detecting circumstances around a vehicle; and setting an upper-limit speed of the vehicle in automatic parking control, wherein the setting of the upper-limit speed includes:
setting the upper-limit speed according to a vehicle body size of the vehicle such that the upper-limit speed is lower when the vehicle body size of the vehicle is greater than a preset size than when the vehicle body size of the vehicle is less than the preset size,
determining a degree of contact risk of the vehicle with an object other than the vehicle based on the circumstances of the vehicle detected by the sensor,
setting the upper-limit speed according to the vehicle body size of the vehicle when it is determined that the degree of contact risk is greater than a preset degree threshold,
setting the upper-limit speed according to the vehicle body size of the vehicle and the degree of contact risk such that the upper-limit speed is lower when it is determined that the degree of contact risk is greater than the preset degree threshold than when it is determined that the degree of contact risk is not greater than the preset degree threshold,
setting the upper-limit speed according to the vehicle body size of the vehicle when it is determined that the degree of contact risk is greater than the preset degree threshold such that the upper-limit speed is lower when the vehicle body size of the vehicle is greater than a preset size than when the vehicle body size of the vehicle is less than the preset size; and
performing automatic parking control for automatically parking the vehicle in a parking space at a vehicle speed which is equal to or lower than the upper-limit speed.

10. A non-transitory storage medium storing instructions cause a computer to perform: detecting circumstances around a vehicle; and setting an upper-limit speed of the vehicle in automatic parking control, wherein the setting of the upper-limit speed includes:
setting the upper-limit speed according to a vehicle body size of the vehicle such that the upper-limit speed is lower when the vehicle body size of the vehicle is greater than a preset size than when the vehicle body size of the vehicle is less than the preset size,
determining a degree of contact risk of the vehicle with an object other than the vehicle based on the circumstances of the vehicle detected by the sensor,
setting the upper-limit speed according to the vehicle body size of the vehicle when it is determined that the degree of contact risk is greater than a preset degree threshold,
setting the upper-limit speed according to the vehicle body size of the vehicle and the degree of contact risk such that the upper-limit speed is lower when it is determined that the degree of contact risk is greater than the preset degree threshold than when it is determined that the degree of contact risk is not greater than the preset degree threshold,
setting the upper-limit speed according to the vehicle body size of the vehicle when it is determined that the degree of contact risk is greater than the preset degree threshold such that the upper-limit speed is lower when the vehicle body size of the vehicle is greater than a preset size than when the vehicle body size of the vehicle is less than the preset size; and
performing automatic parking control for automatically parking the vehicle in a parking space at a vehicle speed which is equal to or lower than the upper-limit speed.

\* \* \* \* \*